(12) United States Patent
Gassner

(10) Patent No.: US 10,498,192 B2
(45) Date of Patent: Dec. 3, 2019

(54) ACTUATOR

(71) Applicant: LIMOSS(SHENZHEN) CO., LTD., Shenzhen (CN)

(72) Inventor: Christian Gassner, Shenzhen (CN)

(73) Assignee: LIMOSS(SHENZHEN) CO., LTD., Shenzhen (CN)

( * ) Notice: Subject to any disclaimer, the term of this patent is extended or adjusted under 35 U.S.C. 154(b) by 261 days.

(21) Appl. No.: 15/535,377

(22) PCT Filed: May 5, 2016

(86) PCT No.: PCT/CN2016/081181
§ 371 (c)(1),
(2) Date: Jun. 12, 2017

(87) PCT Pub. No.: WO2017/133098
PCT Pub. Date: Aug. 10, 2017

(65) Prior Publication Data
US 2018/0097422 A1    Apr. 5, 2018

(30) Foreign Application Priority Data

Feb. 2, 2016 (CN) .................... 2016 2 0103656 U

(51) Int. Cl.
*H02K 7/06* (2006.01)
*H02K 11/33* (2016.01)
(Continued)

(52) U.S. Cl.
CPC .......... *H02K 7/06* (2013.01); *F16H 25/2015* (2013.01); *H02K 7/116* (2013.01);
(Continued)

(58) Field of Classification Search
CPC .......... H02K 7/06; H02K 11/33; H02K 7/116; H02K 7/1166; H02K 11/0094;
(Continued)

(56) References Cited

U.S. PATENT DOCUMENTS 2,512,714 A * 6/1950 Carlzen ............... F16H 25/2015
334/77
5,687,507 A * 11/1997 Beran ..................... E05F 15/70
49/340
(Continued)

FOREIGN PATENT DOCUMENTS

CN         1996715      7/2007
CN         201344240    11/2009
(Continued)

OTHER PUBLICATIONS

International Search Report and Written Opinion from PCT/CN2016/081181, dated Sep. 12, 2016.

*Primary Examiner* — Zakaria Elahmadi
(74) *Attorney, Agent, or Firm* — Steven M. Koehler; Westman, Champlin & Koehler, P.A.

(57) ABSTRACT

An actuator (100) which comprises a motor (1), a housing (2) which wraps a periphery of the motor (1), a drive mechanism (3) of which one end is provided with a push rod assembly (34); under the function of the motor (1), the push rod assembly (34) moves forward; wherein, a returning spring (4) is arranged along external sides of the housing (2) and the drive mechanism (3), and the two ends of the returning spring (4) are respectively connected at the housing (2) and the push rod assembly (34); under the force of the returning spring (4), the push rod assembly (34) moves backward to an initial position of the push rod assembly. The actuator is simple in structure and has self-returning function.

12 Claims, 4 Drawing Sheets

(51) Int. Cl.
*F16H 25/20* (2006.01)
*H02K 7/116* (2006.01)
*H02K 11/00* (2016.01)

(52) U.S. Cl.
CPC ......... *H02K 11/0094* (2013.01); *H02K 11/33* (2016.01); *F16H 2025/2031* (2013.01); *F16H 2025/2071* (2013.01)

(58) Field of Classification Search
CPC ......... F16H 25/2015; F16H 2025/2031; F16H 2025/2071
See application file for complete search history.

(56) References Cited

U.S. PATENT DOCUMENTS

| | | | | |
|---|---|---|---|---|
| 6,223,971 | B1* | 5/2001 | Sato | B23K 11/31 228/12 |
| 6,603,228 | B1* | 8/2003 | Sato | B23K 11/31 310/12.32 |
| 7,464,627 | B2* | 12/2008 | Ko | E05B 15/004 185/39 |
| 8,459,133 | B2* | 6/2013 | Inoue | F16H 25/2015 74/567 |
| 9,312,738 | B2* | 4/2016 | Winther | F16H 25/20 |
| 2007/0138803 | A1* | 6/2007 | Benoit | E05B 15/0086 292/201 |
| 2007/0261310 | A1* | 11/2007 | Porat | E05F 1/1091 49/340 |
| 2009/0293655 | A1* | 12/2009 | Tseng | F16H 25/2015 74/89.37 |
| 2016/0010731 | A1* | 1/2016 | Stensgaard | F16D 28/00 74/89.35 |

FOREIGN PATENT DOCUMENTS

| | | |
|---|---|---|
| CN | 203278531 | 11/2013 |
| DE | 19947972 | 4/2001 |

\* cited by examiner

ACTUATOR

FIELD OF THE INVENTION

The present application relates to an actuator, especially to an actuator with self-returning function.

BACKGROUND OF THE INVENTION

Current actuators are widely used in intelligent furniture such as an electric sofa and an electric bed, and also used in electric telescoping devices in hospital such as a medical bed and a dental chair. However, when specific devices such as the electric sofa, the electric bed, the medical bed and the dental chair use bidirectional (with thrust and pull force) actuators, pull strength thereof is powerful, hands and legs of a user will be easy to be crushed or even broke and an accident will occur by the slightest carelessness when the actuator is pulled back. Therefore, these specific devices can only utilize unidirectional (only with thrust force) actuators. Since the actuator only has unidirectional thrust force, devices such as the electric sofa, the electric bed, the medical bed and the dental chair have no self-returning function after they are pushed out, and only external force applied by a person can reposition the devices.

SUMMARY OF THE INVENTION

The present application aims to provide an actuator with simple structure and self-returning function.

In order to solve the above technical problem, the technical solutions of the present application are: providing an actuator which comprises a motor, a housing which wraps a periphery of the motor, a drive mechanism of which one end is provided with a push rod assembly; under the function of the motor, the push rod assembly moves forward; wherein, a returning spring is arranged along external sides of the housing and the drive mechanism, and the two ends of the returning spring are respectively connected at the housing and the push rod assembly; under the force of the returning spring, the push rod assembly moves backward to its initial position.

Optionally, the drive mechanism comprises a spindle and a spindle nut sheathed around the spindle, a rear end of the push rod assembly is detachably sheathed around an external wall of a front end of the spindle nut.

Optionally, the drive mechanism comprises a push rod bracket; the push rod assembly is inserted into the push rod bracket and a front end of the push rod assembly penetrates beyond the front end of the push rod bracket, wherein the returning spring is hooked on the front end of the push rod assembly.

Optionally, the push rod assembly comprises a push rod and a push rod front cover mounted at a front end of the push rod, wherein one end of the returning spring is hooked on the push rod front cover.

Optionally, the housing is provided with a line output hole, and a hook is mounted on the housing at the output hole, and the other end of the returning spring is hooked at the hook.

Optionally, one side of the front end of the push rod assembly is provided with a first hook portion, and the housing is provided with a second hook portion corresponding to the first hook portion, and both ends of the returning spring are respectively hooked at the first hook portion and the second hook portion; the first hook portion and the second hook portion are located on the same horizontal plane.

Optionally, the housing comprises a body and an upper cover mounted above the body; the second hook portion is provided on the upper cover or the body.

Optionally, the actuator further comprises a first stroke switch and a second stroke switch respectively provided at both ends of the push rod bracket, in which the first stroke switch cooperates with the spindle nut so as to stop the spindle nut from moving along a first axial direction of the spindle; the second stroke switch cooperates with the spindle nut so as to stop the spindle nut from moving along a second axial direction of the spindle.

Optionally, the drive mechanism further comprises a bracket front cover disposed on the front end of the push rod bracket; the push rod assembly further comprises a push rod ring, and the push rod ring is fixedly connected to the first end of the push rod, when the spindle nut is cooperated with the second stroke switch, the push rod ring is stopped within the bracket front cover and the front end of the push rod penetrates beyond the bracket front cover.

Optionally, the push rod ring is provided with a plurality of stoppers which are stopped within the bracket front cover when the spindle nut is cooperated with the second stroke switch.

Optionally, the drive mechanism further comprises a worm gear which is drivingly connected to an output shaft drive of the motor, and the spindle is connected to the worm gear and rotates in synchronism with the worm gear.

Optionally, an outer wall of the spindle nut is provided with a plurality of limit ribs which are limited by and fitted with an inner wall of the push rod bracket.

Compared with the prior art, a returning spring is provided outside the actuator of the present embodiments, and the push rod assembly can be automatically repositioned by the returning spring without external force applied by a person to the push rod assembly.

In which:
100. actuator;
1. motor;
2. housing;
24. line input hole;
25. control hole;
26. line output hole;
21. body;
22. upper cover;
23. lower cover;
27. hook;
271. second hook portion;
28. control circuit board;
3. drive mechanism;
31. worm gear;

32. spindle;
33. spindle nut;
331. limit rib;
34. push rod assembly;
341. push rod;
342. push rod front cover;
3421. first hook portion;
343. push rod ring;
35. push rod bracket;
36. bracket front cover;
37. bracket rear cover;
38. stroke assembly;
381. stroke switch;
4. returning spring.

DETAILED DESCRIPTION OF THE PREFERRED EMBODIMENT

In order to make the purposes, technical solutions, and advantages of the present application clearer, the present application will be further described in detail hereinafter with reference to accompanying drawings and embodiments. It should be understood that the specific embodiments described herein are merely intended to explain but not to limit the present application.

It is to be noted that when referred to as being "fixed to" or "arranged in" another element, an element may be located directly or indirectly on the another element. When referred to as being "connected to" another element, an element may be directly or indirectly connected to another element.

It is also to be noted that locality terms such as left, right, upper and lower in the embodiment are relative concepts, or referenced against normal operation state of a product, which should not be deemed limitative.

Figure 3:
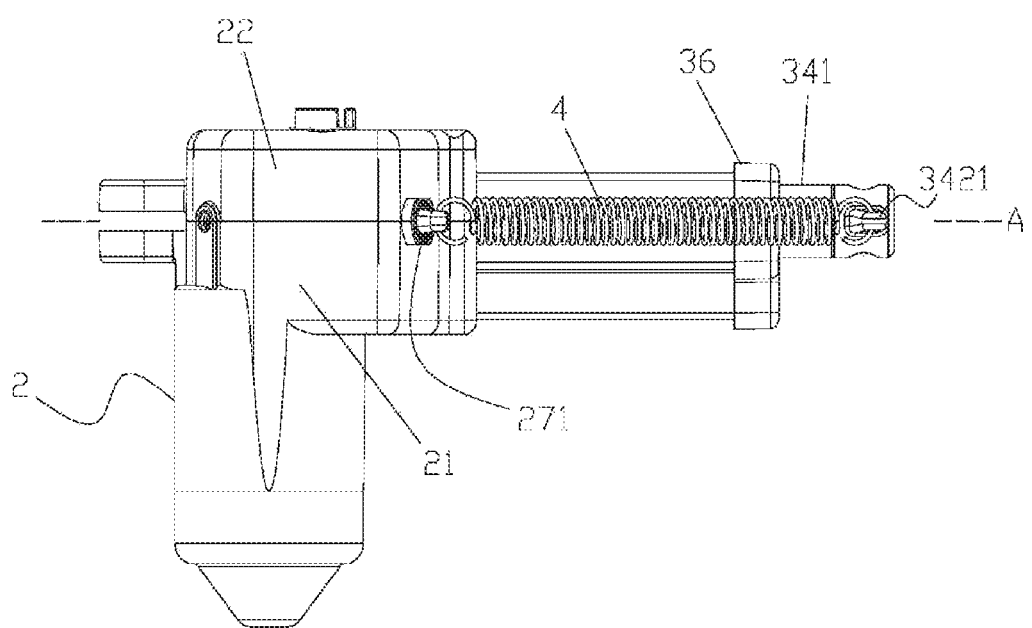
FIG. 3 is a front structural schematic view of the actuator of FIG. 2.
Figure 4:
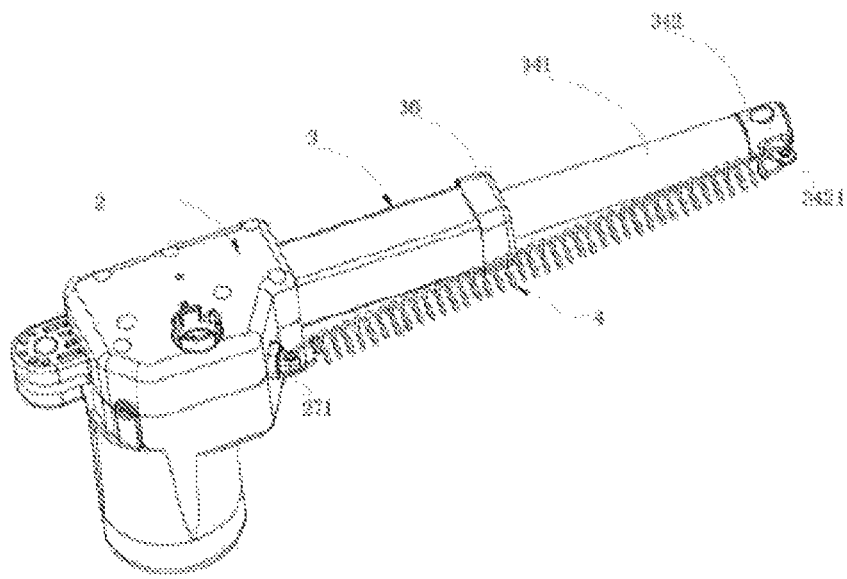
FIG. 4 is a perspective structural schematic view of the actuator when the push rod is pushed out according to an embodiment of the present application.

For better understanding, take FIG. 3 for example, right side of FIG. 3 shows a forward direction of the actuator; left side of FIG. 3 shows a backward direction of the actuator; the forward direction indicates a direction towards which the push rod assembly moves forward, and corresponding backward direction indicates a direction towards which the push rod assembly moves backward. The terms "front" or "front end", "rear" or "rear end" hereinafter indicate relative directions; for example, the rear end of the push rod is a first end and the front end of the push rod is a second end, and so on.

Figure 1:
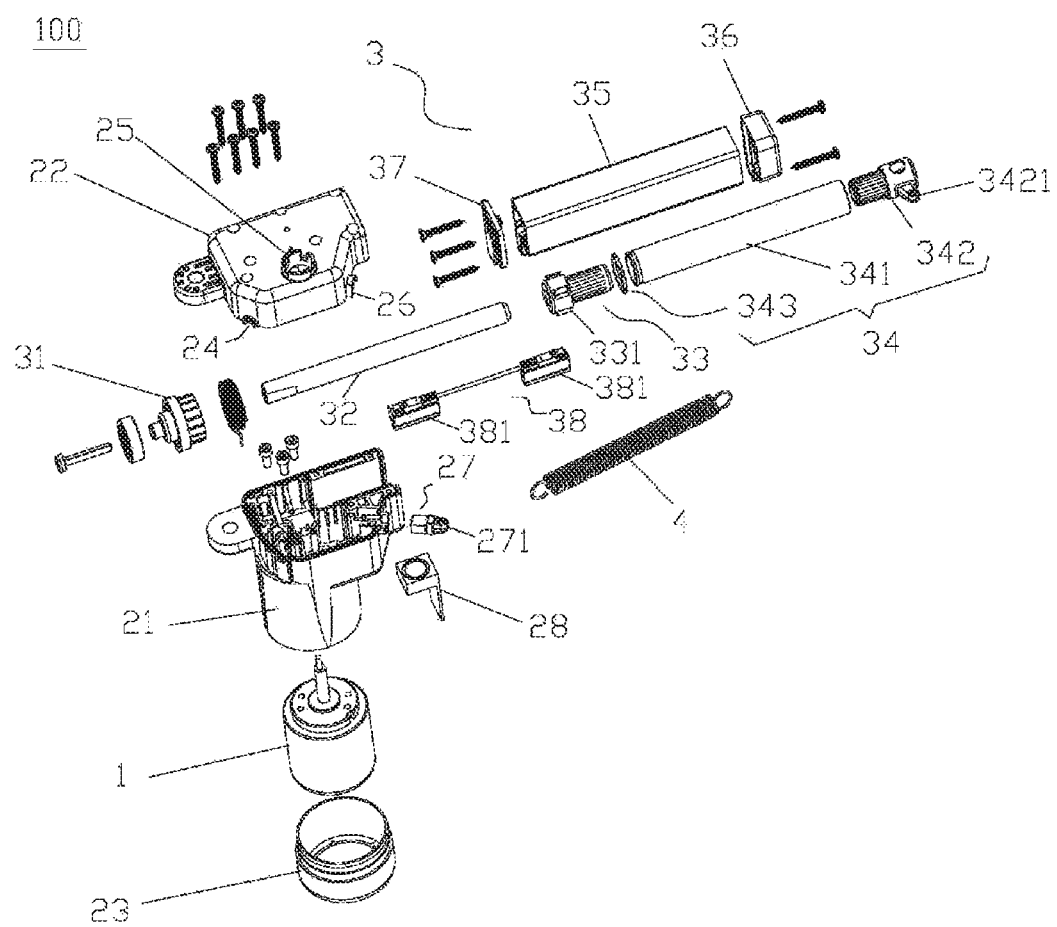
FIG. 1 a perspective exploded view of an actuator according to an embodiment of the present application FIG. 2 a perspective structural view of the actuator according to an embodiment of the present application.

As shown in FIG. 1, the actuator 100 of the present application is applied to apparatuses such as electric sofa, electric bed, medical beds and dental chairs, the actuator 100 comprises a motor 1, a housing 2; the housing 2 wraps a periphery of the motor 1, which means the motor 1 is disposed inside the housing 2; the actuator 100 further comprises a drive mechanism 3 which may drive an external member (not shown, such as a sofa, a bed, a chair and the like) upward or forward driven by the motor 1, under which circumstance a push rod assembly 34 in the drive mechanism 3 extrudes forward.

As shown in FIG. 1, the housing 2 comprises a body 21 with a cavity, an upper cover 22 and a lower cover 23 respectively fitted to upper and lower ends of the body 21; the motor 1 is accommodated in the cavity of the body 21 from below the body 21 and is fixed to the body 21 by a screw (not shown). After the motor 1 is fixed, the lower cover 23 is mounted to the lower end of the body 21 from below the motor 1. A control circuit board 28 is accommodated in the housing 2 and is located on a side of the body 21 for controlling the motor 1; the housing 2 is provided with a line input hole 24, a control hole 25 and a line output hole 26; both the line input hole 24 and the line output hole 26 are located at engaged regions between the body 21 and the upper cover 22, and the control hole 25 is located on the upper cover 23. The control circuit board 28 outputs corresponding input terminal, control terminal and output terminal which penetrate from corresponding holes. After the drive mechanism 3 has been correctly assembled on the body 21, the upper cover 22 is locked on the body 21 by screws (not shown).

As shown in FIG. 1, the drive mechanism 3 comprises a worm gear 31, a spindle 32, a spindle nut 33, a push rod 341 and a push rod bracket 35. A rear end of the push rod bracket 35 is fixed between the upper cover 22 and the body 21 through a bracket rear cover 37, and a bracket front cover 36 is covered at a front end of the push rod bracket 35, and the push rod 341 is inserted into the push rod bracket 35 and a front end of the push rod 341 is inserted throughout the bracket front cover 36; a rear end of the push rod 341 is detachably fitted to an outer wall of a front end of the spindle nut 33. The front end of the spindle nut 33 can be freely plugged into the rear end of the push rod 341. Further, a plurality of limit ribs 331 are disposed on an outer wall of the rear end of the spindle nut 33, and the limit ribs 331 are limited by and cooperated with an inner wall of the push rod bracket 35, which means the inner wall of the push rod bracket 35 is provided with a guide slot structure which cooperates with the limit rib 331 so as to guide the spindle nut 33 by the cooperation between the guide slot structure and the limit rib 331, and restrict rotation of the spindle nut 33. The push rod 341 is confined in the push rod bracket 35 along upper, lower, left and right directions by the bracket front cover 34 and the spindle nut 33. The spindle nut 33 is sheathed around the spindle 32, and the inner wall of the spindle nut 33 is provided with an internal thread which engages with an external thread of the spindle 32. Neither the outer wall of the front end of the spindle nut 33 nor the inner wall of the rear end of the push rod 341 is configured with threads engaged with each other, i.e., the spindle nut 33 is connected by thread to the spindle 32 and is detachably cooperated with the push rod 341. A rear end of the spindle 32 is inserted into a central hole of the worm gear 31, and rotates synchronously with the worm gear 31 (surely, the rear end of the spindle 32 can also be disposed to be a teeth shape engaged with the worm gear 31, thus a drive mode between the worm gear 31 and the spindle 32 can be realized in the form of a worm gear and a spindle), the worm gear 31 cooperates with a rotating shaft of the motor 1, and a rotation of the motor 1 is transmitted to the spindle 32 through the worm gear 31, such that the spindle 32 can be rotated with the rotation of the motor 1. Because neither the outer wall of the front end of the spindle nut 33 nor the inner wall of the rear end of the push rod 341 is configured with threads engaged with each other, when the motor 1 rotates clockwise, the push rod 341 moves unidirectionally and forward inside the push rod bracket 35 driven by the spindle 32 and the spindle nut 33; when the motor 1 rotates anticlockwise, and when the spindle nut 33 moves backward with the rotation of the spindle 32 and no force is imposed on the push rod 341 (a returning spring 4 has not been provided), the push rod 341 would not move backward along with the movement of the spindle nut 33, therefore, only when the returning spring 4 is mounted can the spindle nut 33 move backward. Under the returning elastic force of the returning spring 4, the push rod 341 moves backward along with the spindle nut 33. A stroke assembly 38 is mounted inside the push rod bracket 35; two sides of the stroke assembly 38 are arranged with two stroke switches 381, which are a first stroke switch and a second stroke switch for limiting forward and backward displacement distances of the spindle nut 33. The first stroke switch cooperates with the spindle nut 33 so as to stop the spindle nut 33 from moving along a first axial direction of the spindle; the second stroke switch cooperates with the spindle nut 33 so as to stop the spindle nut 33 from moving along a second axial direction of the spindle, thereby controlling the extension that the push rod 341 protrudes from the push rod bracket 35, wherein the first axial direction is a direction towards which the push rod 341 is pulled back and the second axial direction is a direction towards which the push rod 341 is pushed out.

Figure 2:
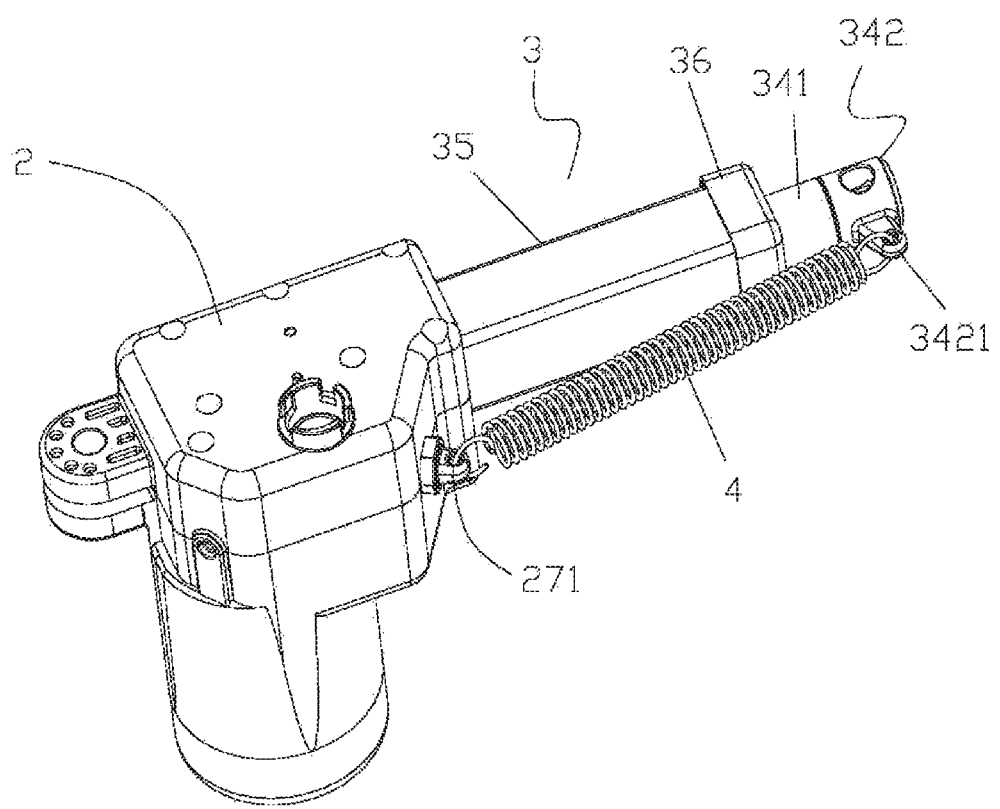

As shown in FIGS. 1 and 2, a push rod front cover 342 configured to connect the actuator 100 and the external member is mounted at the front end of the push rod 341, a first hook portion is protruded over by one side of the push rod front cover 342. To stop the push rod 341 from breaking away from the push rod bracket 35 from a front end of the bracket front cover 36, an annular-shape push rod ring 343 sheathes around the outer wall of the rear end of the push rod 341, which means the push rod ring 343 is fixedly connected to a first end of the push rod 341, and an external diameter of the push rod ring 343 is provided with a plurality of stopping members (with no reference number). When the push rod 341 moves forward to a maximum distance, the stopping members are limited within the bracket front cover 36. The push rod front cover 342, the push rod 341 and the push rod ring 343 constitute a push rod assembly 34. A hook 27 is mounted in the line output hole 26, and the actuator 100 requires additional tieline to perform an output function at this time; a second hook portion 271 corresponding to the first hook portion 3421 is extended out from the hook 27; one end of the returning spring 4 is hooked on the first hook portion 3421, and the other end of the returning spring 4 is hooked on the second hook portion 271. Surely, the first hook portion 3421 can also be disposed on a side of the push rod front cover 342, and the second hook portion 271 can be disposed on corresponding side of the upper cover 22; two ends of the returning spring 4 are respectively hooked at the first hook portion 3421 and the second hook portion 271. In the embodiment, the first hook portion 3421 and the second hook portion 271 are disposed in the same horizontal plane, the horizontal plane is parallel to the axis of the push rod 341. In actual practice, the housing 2 is not provided with the line output hole 26, and the second hook portion 271 is directly extended out from an area in the housing 2 corresponding to the line output line 26 or else.

As shown in FIGS. 2 and 3, a returning spring 4 is disposed along external sides of the housing 2 and the drive mechanism 3, and the two ends of the returning spring 4 are respectively hooked at the first hook portion 3421 and the second hook portion 271. When the motor 1 rotates clockwise to drive the spindle 32 to push out the push rod 341 and then rotates anticlockwise to drive the spindle 32 to drive the spindle nut 33 back to its initial position, under the pull force of the returning spring 4, the push rod 341 inside the push rod bracket 35 moves backward along with the spindle nut 33 and is repositioned ultimately, which means the push rod 341 requires no external force applied by a person to realize reposition. The returning spring 4 can be replaced by alternative elastic member as long as the push rod 341 can be pulled back by the elastic force of the elasticity of the elastic member itself.

Figure 5:
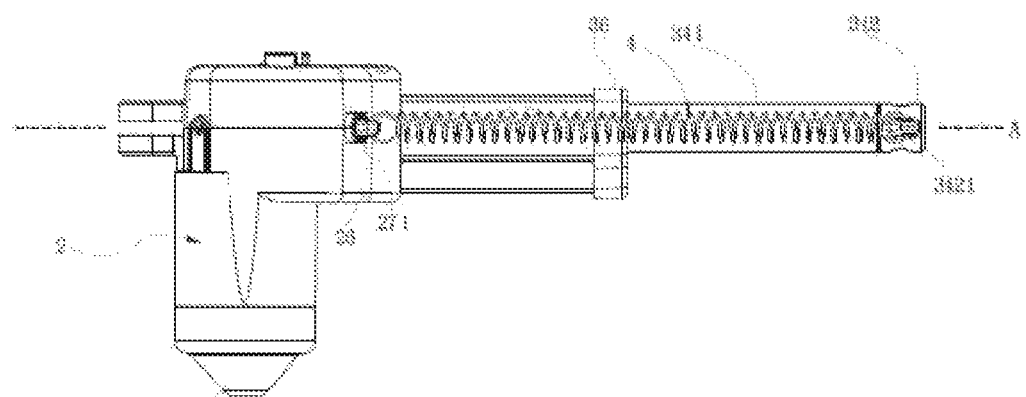
FIG. 5 is a perspective structural schematic view of the actuator of FIG. 4.

As shown in FIGS. 1 and 5, in order to ensure that the push rod 341 can be pushed out and pulled back smoothly, the first hook portion 3421 and the second hook portion 271 is on the same horizontal plane, and the horizontal plane is a plane A on which the push rod 341 moves forward and backward (the plane A is parallel to the axis of the push rod 341) as shown in FIGS. 3 and 5. When the push rod 341 is pushed out, the returning spring 4 is stretched, however, since the spindle nut 33 has not been retreated, after pushed out, the push rod 341 would not be pulled back immediately. Only when the spindle nut 33 is retreated by reversing the motor 1 in advance can the push rod 341 be pulled back to its initial position through the pull force of the returning spring 4. Since there is no connection between the spindle nut 33 and the push rod 341, which are only non-thread cooperated, without force applied by the returning spring 4 or a person, even when the spindle nut 33 has been retreated, the push rod 341 can still not move backward. The returning spring 4 can still fixedly connected to the first hook portion 341 and the second hook portion 271 and can not be detached from the actuator 100 conveniently, which can avoid malicious disassembly.

Above all, the actuator of the present embodiments possesses the following advantageous effects:

1. Under the function of the returning spring 4, the push rod assembly 34 can return automatically, which means the actuator 100 has self-returning function.

2. Since the first hook portion 3421 and the second hook portion 271 are on the same horizontal plane, and the horizontal plane is the plane A on which the push rod 341 moves forward and backward, the processes that the push rod 341 is pulled back by the returning spring 4 and is pushed out by the motor 1 are smooth and even.

3. The other end of the retuning spring 4 is hooked to the hook 27 of the line output hole 24; hence transform to original housing 2 is avoided, thereby reducing manufacturing cost.

The above contents are only preferred embodiments of the present application, and are not intended to limit the present application. Any modifications, equivalent replacements and improvement made within the spirit and principle of the present application should be contained within the protection scope of the present application.

What is claimed is:

1. An actuator comprising a motor, a housing which wraps a periphery of the motor, a drive mechanism, one end of the drive mechanism is provided with a push rod assembly; under the function of the motor, the push rod assembly moves forward; wherein, a returning spring is arranged along external sides of the housing and the drive mechanism, and the two ends of the returning spring are respectively connected at the housing and the push rod assembly; under a force of the returning spring, the push rod assembly moves backward to an initial position of the push rod assembly; and
   wherein the drive mechanism comprises a spindle and a spindle nut sheathed around the spindle, and the spindle nut is not in threaded connection with the push rod assembly.

2. The actuator of claim 1, wherein a rear end of the push rod assembly is detachably sheathed around an external wall of a front end of the spindle nut.

3. The actuator of claim 2, wherein the drive mechanism comprises a push rod bracket, the push rod assembly is inserted into the push rod bracket and a front end of the push rod assembly penetrates beyond a front end of the push rod bracket, and the returning spring is hooked at the front end of the push rod assembly.

4. The actuator of claim 3, wherein the push rod assembly comprises a push rod and a push rod front cover mounted at a front end of the push rod; one end of the returning spring is hooked at the push rod front cover.

5. The actuator of claim 4, wherein the housing is provided with a line output hole and a hook is mounted on the housing at the output hole, and a second end of the returning spring is hooked at the hook.

6. The actuator of claim 1, wherein one side of the front end of the push rod assembly is provided with a first hook portion, and the housing is provided with a second hook portion corresponding to the first hook portion, and both ends of the returning spring are respectively hooked at the first hook portion and the second hook portion; the first hook portion and the second hook portion are located on the same horizontal plane.

7. The actuator of claim 6, wherein the housing comprises a body and an upper cover mounted above the body; the second hook portion is provided on the upper cover or the body.

8. The actuator of claim 4, wherein the actuator further comprises a first stroke switch and a second stroke switch respectively provided inside both ends of the push rod bracket, the first stroke switch cooperates with the spindle nut so as to stop the spindle nut from moving along a first axial direction of the spindle; the second stroke switch cooperates with the spindle nut so as to stop the spindle nut from moving along a second axial direction of the spindle.

9. The actuator of claim 8, wherein the drive mechanism further comprises a bracket front cover disposed on the front end of the push rod bracket; the push rod assembly further comprises a push rod ring, and the push rod ring is fixedly connected to a first end of the push rod, when the spindle nut is cooperated with the second stroke switch, the push rod ring is stopped within the bracket front cover and the front end of the push rod penetrates beyond the bracket front cover.

10. The actuator of claim 9, wherein the push rod ring is provided with a plurality of stoppers which are stopped within the bracket front cover when the spindle nut cooperates with the second stroke switch.

11. The actuator of claim 3, wherein the drive mechanism further comprises a worm gear which is drivingly connected to an output shaft of the motor, and the spindle is connected to the worm gear and rotates in synchronism with the worm gear.

12. The actuator of claim 3, wherein an outer wall of the spindle nut is provided with a plurality of limit ribs which are limited by and cooperated with an inner wall of the push rod bracket.

* * * * *